Patented June 11, 1929.

1,717,317

UNITED STATES PATENT OFFICE.

CAPERTON HORSLEY AND EDWIN R. GOLDFIELD, OF CLEVELAND, OHIO, ASSIGNORS TO THE ENGELN ELECTRIC COMPANY, OF CLEVELAND, OHIO.

CONTROLLING MEANS FOR ELECTRIC CIRCUITS.

Application filed July 15, 1927. Serial No. 205,961.

This invention relates to controlling means for electric circuits, and more particularly to means for automatically controlling the voltage of an alternating current circuit or a portion thereof.

It is within the scope of our invention to arrange in the circuit, as in the primary circuit of the filament transformer of an X-ray apparatus, means for imparting such characteristics to this circuit that the current output of the transformer will be either substantially independent of the line voltage or may even decrease as the line voltage is increased.

For this purpose, and more particularly, we arrange in the circuit certain elements having inductive and capacitative electrical properties or characteristics, of the proper instantaneous values to control the phase displacement of the amperage in the circuit with respect to the impressed line voltage.

The action of the condenser element is uniform. The inductive element or elements however, are of the iron core type and so proportioned electrically that saturation of the core or cores will be reached at predetermined conditions of impressed voltage, at which point the counter-electromotive force built up in the inductance ceases to increase in proportion to the increase in impressed voltage, and will hence result in a more than proportional increase in current flow in the circuit. Such action may be considered as the result of the iron core becoming saturated, producing a falling characteristic of the inductance.

Figure 1:
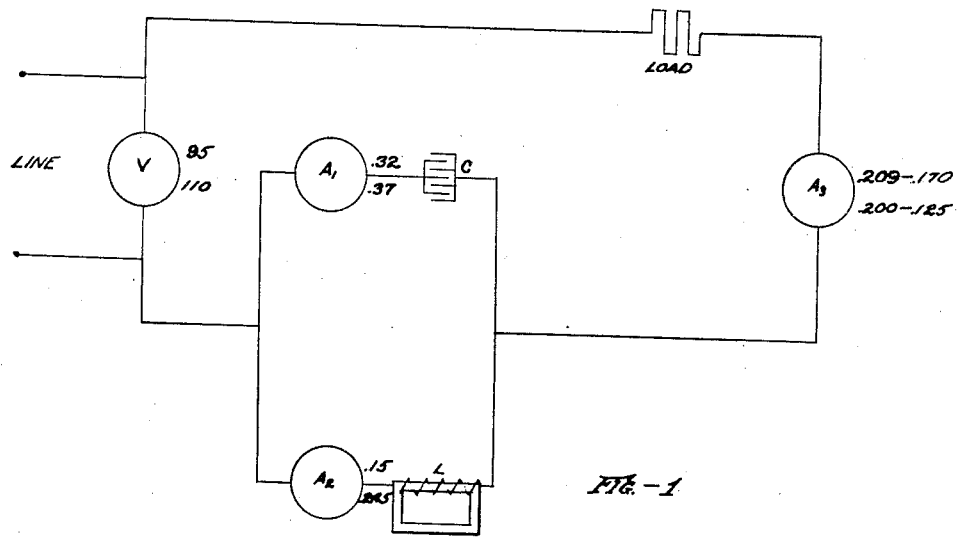
Figure 2:
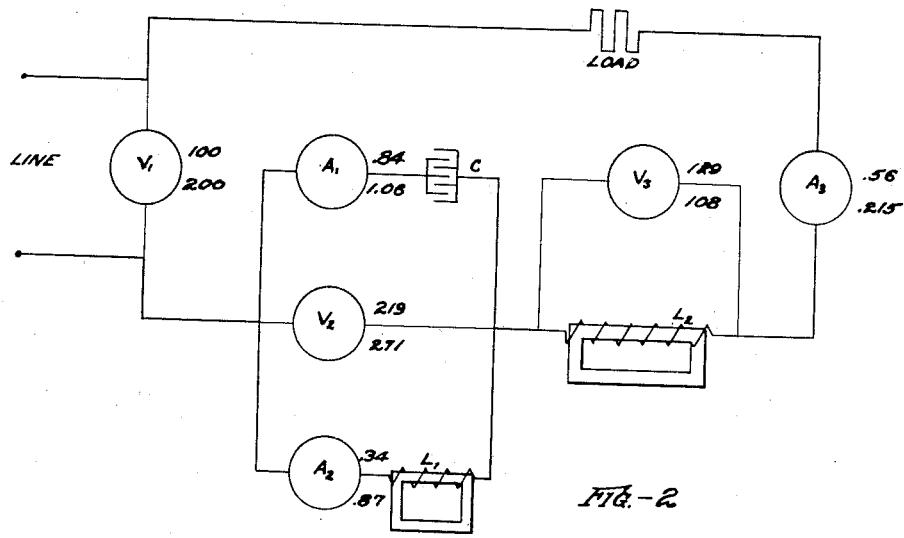
Figure 3:
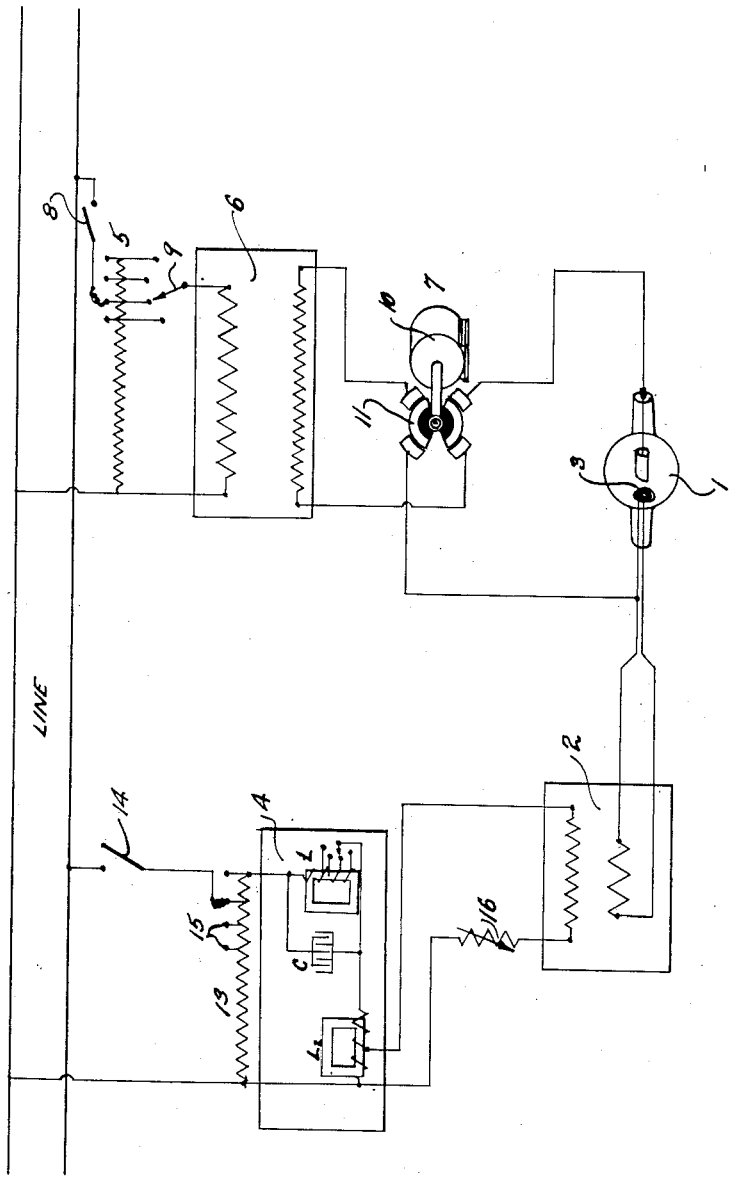

The exact nature, together with further objects and advantages of the invention, will appear from the following description taken in connection with the accompanying diagrammatic drawings in which Fig. 1 represents a simple elementary circuit illustrative of the principal of the invention; Fig. 2 represents a modification of the same; and Fig. 3 represents an adaptation of the modification appearing in Fig. 2, in circuit in an X-ray installation.

Referring now to Fig. 1 a complete circuit is illustrated including the line and a load, a volt meter V and an ammeter A3 being in the load circuit, a portion of this circuit however passing in parallel through a condenser C and a cored inductance L respectively, the ammeters A1 and A2 being arranged to indicate the current values flowing through these elements.

Suppose now that an alternating current at 95 volts is supplied by the line, and that the electrical values of the condenser C, the inductance L, and the load are such that the ammeter A1 will read .32, A2 will read .15 and A3 will read .209 all as indicated in the upper set of figures applied to the drawings. If there were no resistance in the circuit, the amperage through A—3 would be the difference between the amperage through A—1 and A2, since that through A—1 would be leading 90° and that through A—2 lagging 90°, in which case the amperage through A—3 would be .170. However the figures shown are actual readings taken in a circuit following the one indicated and in which, as in all circuits, resistance is present in the various elements of the circuit including the load. Suppose now that the line voltage is increased to 110. The readings on the three ammeters now appear .37, .245, and .200 respectively. Here again the reading of the ammeter A3 should be the difference .37 minus .245, or .125, if there were no resistance to be considered, but in this case the reading .200 is obtained. From the two sets of readings it appears that an increase in the line voltage of approximately 15% produces an actual drop in the load current of approximately 5%. The explanation of this result is that the inductance L, including the core thereof has been so proportioned electrically with respect to the other electrical components of the circuit that increasing the line voltage to 110 passes the saturation point of the iron core so that the current flow through the inductance at the increased voltage becomes no longer proportional to the voltage impressed. Now—although the increased current through L is not lagging to quite the same extent that it was at the previous setting, due to the fact that a greater proportion of the amperage through L passes, as it were, solely through a resistance and is in phase with the line voltage and a smaller proportion of the amperage is due to a purely inductive load and lags 90° behind the impressed voltage—the resultant current is still lagging, whereas the current through C is still leading at the same angle as that of the previous setting.

Referring now to Fig. 2 the circuit here is generally similar to that of Fig. 1 with the inclusion of a volt meter V—2 across the parallel portion of the circuit and the addition of a second cored inductance L—2. The values of the elements in this circuit are such that at an impressed voltage of 100 the potential drop across the parallel portion of the circuit will be 219, that across the inductance L—2 will be 129 and the three ammeters A—1, A—2 and A—3 will read respectively .84, .34 and .56, all as indicated in the upper set of figures in the drawing. Likewise in the same circuit at an impressed voltage of 200 the ammeter A—3 will read .215 and the other meters as indicated by the lower set of figures. It is seen that in the circuit of Fig. 2 therefore, an increase of 100% in the impressed voltage will cause a decrease in current flow to the load of more than 50%.

By the addition of an inductance L—2 in series with an arrangement similar to that shown in Fig. 1, this circuit is made more flexible. Thus with the values of C and L that were used in Fig. 2 it would be necessary to increase the voltage from 219 to 271 plus the voltage drop across the load in order to have the amperage through the load change from .56 to .215; but with the addition of inductance L—2, this change in amperage occurs for a line variation of from 100 to 200 volts. The increase of voltage V—2 upon the addition of inductance L—2 is due, of course, to the fact that the voltage V—3 is out of phase with V—2.

Turning now to Fig. 3, 1 is an X-ray tube; 2 is a low voltage transformer, the secondary of which is arranged to supply the filament 3 of the X-ray tube; 4 is a circuit arrangement generally similar to that shown in Fig. 2; 5 is an auto transformer; 6 is a step-up transformer, the secondary of which passes through a synchronous rectifier 7 and to the tube 1. The transformer 5 is energized by the line subject to the switch 8, and is provided on its primary side with taps whereby the same may be accommodated to the line voltage available. A selector 9 on the secondary side of the transformer 5 controls the voltage taken from this transformer 5. The rectifier 7 comprises the usual synchronous motor 10 and rotating disc 11 whereby the high tension alternating current output of transformer 6 is rectified before passing to the high tension terminals of the tube. An auto transformer 13 subject to the switch 14, and provided with taps 15 for accommodation to nominal line voltage, delivers a low voltage current, controlled by the variable inductance 16, to the primary of the filament supply transformer 2. The circuit 4 includes the condensive element C, and the tapped inductances L and L—2 as before, the values of these elements being so chosen that the desired automatic regulation of the filament current is obtained whereby though the line voltage be increased above the nominal amount no increase in the filament current, and hence no appreciable increase in the emission from the tube, will result.

If the filament of an X-ray tube is kept at a constant temperature and the impressed voltage across the tube is varied, the milliamperage through the tube will vary slightly. By making use of the taps on L, it is possible to adjust the unit so that as the line voltage decreases, the current through the filament will increase just enough to keep the milliamperage through the tube constant, or if the line voltage increases the filament current will decrease.

It will be apparent that by choosing proper values of C, L, and L—2 inclusive of the core characteristics of the inductances, any desired operating characteristic may be given to the circuit.

What we claim is:

1. Circuit control means comprising inductance and capacity elements, including an inductance element arranged in parallel with a capacity element, and an inductance element in series with said parallel elements, one of said inductance elements having a falling characteristic.

2. Circuit control means comprising inductance and capacity elements, including a capacity element and an inductance element arranged in parallel therewith and having a falling characteristic, and a second inductance element arranged in series with said parallel elements.

3. Means for automatically controlling current flow in a circuit to make said current flow substantially independent of variations in applied line voltage, comprising inductance and capacity elements arranged in parallel relation in the circuit, the operating characteristic of the inductance element being such that said element becomes saturated within the range of variation of applied line voltage for which correction is to be made, so that the current passing through that branch of the circuit in which the inductance element is arranged and consequently having a lagging characteristic, will increase more than proportionally with increase of said line voltage, but the current passing through that branch of the circuit in which the capacity element is arranged, will increase only proportionally with said line voltage increase, whereby the resultant current flowing in said circuit will be substantially independent of variations in said applied line voltage.

In testimony whereof we hereby affix our signatures.

CAPERTON HORSLEY.
EDWIN R. GOLDFIELD.